United States Patent
White et al.

(10) Patent No.: US 11,588,396 B2
(45) Date of Patent: Feb. 21, 2023

(54) DUAL THRESHOLD OVERCURRENT RESET

(71) Applicant: Hamilton Sundstrand Corporation, Charlotte, NC (US)

(72) Inventors: Adam Michael White, Cherry Valley, IL (US); Dwight D. Schmitt, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 251 days.

(21) Appl. No.: 16/791,593

(22) Filed: Feb. 14, 2020

(65) Prior Publication Data

US 2021/0257901 A1    Aug. 19, 2021

(51) Int. Cl.
*H02M 1/32* (2007.01)
*H02M 5/04* (2006.01)
*H02M 1/00* (2006.01)

(52) U.S. Cl.
CPC ............ *H02M 1/32* (2013.01); *H02M 5/04* (2013.01); *H02M 1/0006* (2021.05); *H02M 1/0025* (2021.05)

(58) Field of Classification Search
CPC ........ H02M 1/32; H02M 5/04; H02M 1/0006; H02M 1/0025
See application file for complete search history.

(56) References Cited

U.S. PATENT DOCUMENTS

| | | | |
|---|---|---|---|
| 5,013,995 A | 5/1991 | Rashid | |
| 7,116,563 B2 | 10/2006 | Hua | |
| 7,990,112 B2 | 8/2011 | Santhirahasan et al. | |
| 9,537,405 B2 | 1/2017 | Baurle et al. | |
| 9,590,524 B1 | 3/2017 | Jacobson | |
| 2010/0284117 A1* | 11/2010 | Crane | B63H 23/24 361/93.1 |
| 2019/0386481 A1 | 12/2019 | Cho et al. | |

OTHER PUBLICATIONS

Extended European search report issued in corresponding EP application No. 21157065.0 dated Jul. 12, 2021.

(Continued)

*Primary Examiner* — Rafael O De Leon Domenech

(74) *Attorney, Agent, or Firm* — Locke Lord LLP; Joshua L. Jones; Scott D. Wofsy

(57) ABSTRACT

A method of operating a power conversion system including converting variable frequency AC voltage to constant frequency AC voltage by a power converter, setting a first peak current reset threshold above operating currents previously observed during steady state short circuit current regulation in by a controller of the power converter, setting a second peak current reset threshold at a current lower than the previously observed steady state short-circuit regulation point observed during previous operation during steady state short circuit current regulation by the controllers of the power converter, resetting inverter converter AC output regulating voltage to 0 volts, and ramping AC output regulating voltage back up into steady-state operation when the second a peak current reset threshold is exceeded.

6 Claims, 2 Drawing Sheets

(56) References Cited

OTHER PUBLICATIONS

Alhuwaishel Fahad et al: "A new active output filter (AOF) for variable speed constant frequency (VSCF) power system in aerospace applications",2015 IEEE Energy Conversion Congress and Exposition (ECCE), IEEE,Sep. 20, 2015 (Sep. 20, 2015), pp. 5439-5446, XP032801314.

Koseoglu Cem et al: "A Hybrid Overload Current Limiting and Short Circuit Protection Scheme: A Case Study on UPS Inverter",2019 8th International Conference on Renewable Energy Research and Applications (ICRERA), IEEE,Nov. 3, 2019 (Nov. 3, 2019), pp. 957-962, XP033716206.

* cited by examiner

DUAL THRESHOLD OVERCURRENT RESET

BACKGROUND

Technological Field

The present disclosure relates to variable speed constant frequency (VSCF) converter systems, and more particularly to controls of VSCF converter systems, such as for providing AC power to loads by an aircraft engine, and in particular short circuit control and protection.

Description of Related Art

In aircraft systems the electrical power generating systems, typically provides two primary functions; regulate and maintain AC voltage and provide power to aircraft loads over nominal and overload conditions. Secondly the generating system must provide and regulate short circuit current in the event and during fault conditions. A fault condition is where at the load bus, one or more phases, are shorted to ground return or shorted to each other. The current must be regulated to a predefined amplitude and for preset amount of time to allow downstream protection devices to clear the fault. The short circuit currents generally can be 1.5 to 2.5 times the normal operating currents seen under normal rated load conditions and represent the highest stress condition for variable speed constant frequency (VSCF) converter systems. This short circuit condition is a key parameter sizing and selecting internal VSCF components; such as power switching devices and filter inductors critical in controlling short circuit currents.

A variety of devices are known in the for back-to-back power conversion. When a short circuit is applied to the output of a power converter during normal operation, the inverter duty cycles are initially high to produce the normal output voltage with normal loading that was present prior to the fault. When the fault is applied the fault impedance is very low and thus the output currents tend to rise rapidly. The converter must deal with very large currents as the controller transitions from voltage mode to current mode control.

It is important to quickly detect these events and then enter a steady-state short circuit current regulation mode where the converter voltage duty cycle is greatly reduced to limit the currents into the fault. The transition from voltage regulation to current regulation experiences very high transient currents and the converter must be sized for this transient, thus in current-art power converter semiconductors and filter inductors sizes are dictated by the initial short circuit transient. Accordingly, there is a need in the art for a method of detecting an overcurrent fault event at the lowest current threshold allowable. There also remains a need in the art for such a method and components that are economically viable. The present disclosure may provide a solution for at least one of these remaining challenges.

SUMMARY OF THE INVENTION

A method of operating a power conversion system includes converting variable frequency AC voltage to constant frequency AC voltage by a power converter, setting a first peak current reset threshold above operating currents previously observed during steady state short circuit current regulation by a controller of the power converter, setting a second peak current reset threshold at a current lower than the previously observed steady state short-circuit regulation point during steady state short circuit current regulation by the controllers of the power converter, resetting converter AC output regulating voltage to 0 volts, and ramping AC output regulating voltage back up into steady-state operation when the second peak current reset threshold is exceeded.

The method can also include raising the second peak current reset threshold to the first peak current reset threshold in order to allow for the converter to deliver short circuit currents levels. If a short circuit is present, the AC output regulating voltage and current output can be ramped up at a controlled rate. An inverter operating duty cycle up can be ramped up to a value where a controller is limiting and regulating short circuit currents, wherein the inverter operating duty cycle can be increased to a preset short circuit RMS current reference value of 1.5 to 2.5 times rated load current. If the AC output voltage is overloaded but no short circuit is present, the AC output voltage can be ramped up to a value set by a pre-determined by a fold-back curve. The foldback curve, represents a relationship between output voltages and load current produced by the VSCF at the POR. When the power converter has ramped up to the value determined by the pre-determined by a fold-back curve or short-circuit current reference value, a higher reset detection threshold can be set by the controller to be used for any subsequent resets of the output voltage.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
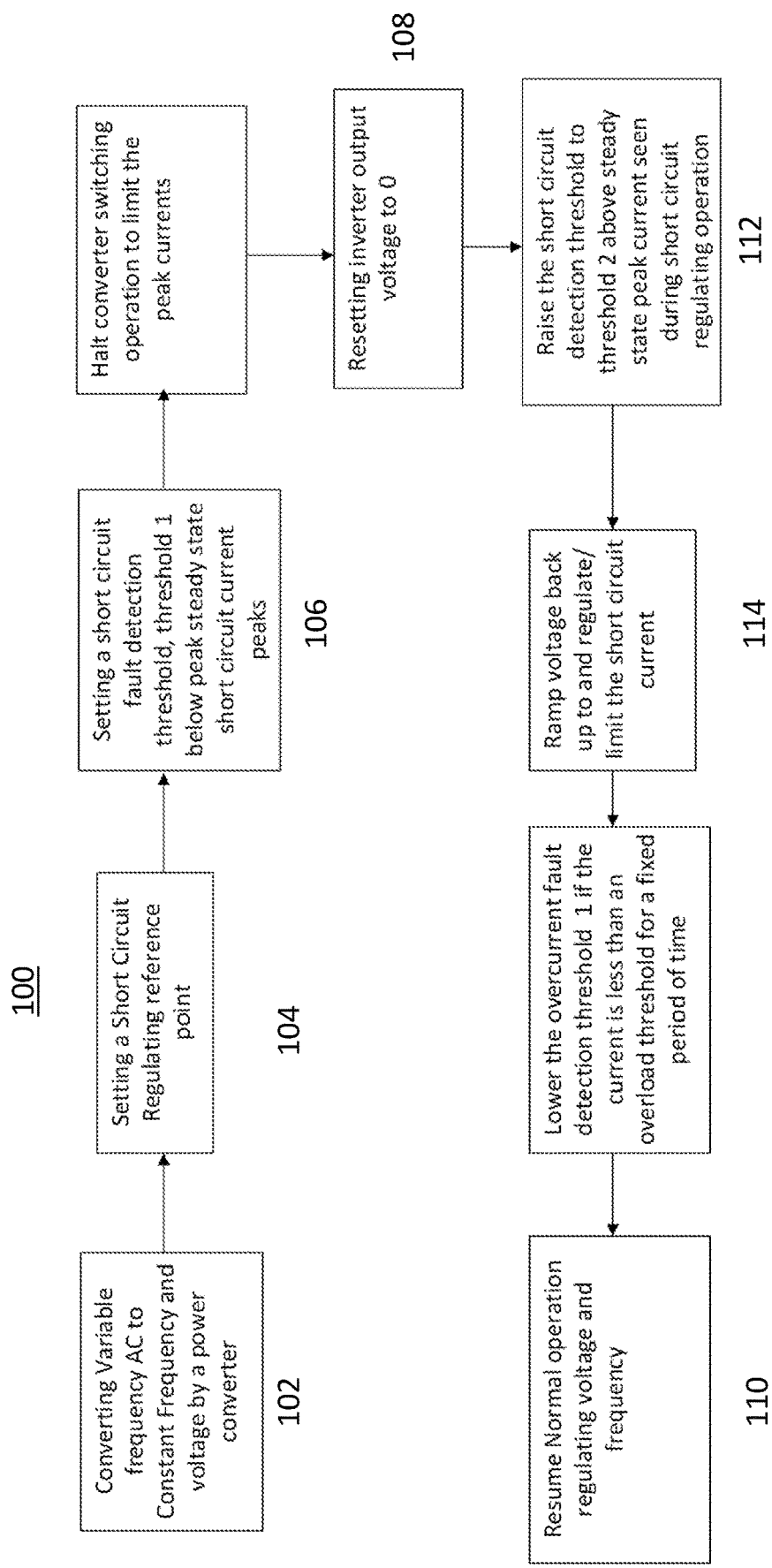
FIG. 1 is a block diagram of showing the steps of the method of the disclosure.

Reference will now be made to the drawings wherein like reference numerals identify similar structural features or aspects of the subject invention. For purposes of explanation and illustration, and not limitation, a partial view of an exemplary embodiment of the method in accordance with the invention is shown in FIG. 1. The methods of the disclosure can be used to reduce the peak operating currents in converter thereby reducing the size of the switching devices and filter inductors.

This disclosure deals with events where the variable speed constant frequency (VSCF) converter is operating in the normal voltage regulating range, currents at or below 1.5 pu when subsequently a load fault, short circuit is applied to the point of regulation load bus. The current increases rapidly and must be detected quickly to immediately decrease the VSCF voltage output from rated to zero volts and cease the build-up of current.

FIG. 1 shows the method 100 of operating a power conversion system including converting 102 variable frequency AC voltage to constant frequency AC voltage by a power converter, setting a first peak current reset threshold above operating currents previously observed during steady state short circuit current regulation by a controller of the power converter 104, setting a second peak current reset threshold at a current lower than the previously observed steady state short-circuit regulation point during steady state short circuit current regulation by the controllers of the power converter 106, resetting converter AC output regulating voltage to 0 volts 108, and ramping AC output regulating voltage back up into steady-state operation when the second peak current reset threshold is exceeded 110. The method also includes raising the second peak current reset threshold to the first peak current reset threshold in order to allow for the converter to deliver short circuit currents levels 112.

If a short circuit is present, the AC output regulating voltage and current output can be ramped up at a controlled rate 114. An inverter operating duty cycle up can be ramped up to a value where a controller is limiting and regulating short circuit currents, wherein the inverter operating duty cycle can be increased to a preset short circuit RMS current reference value of 1.5 to 2.5 times rated load current.

Figure 2:
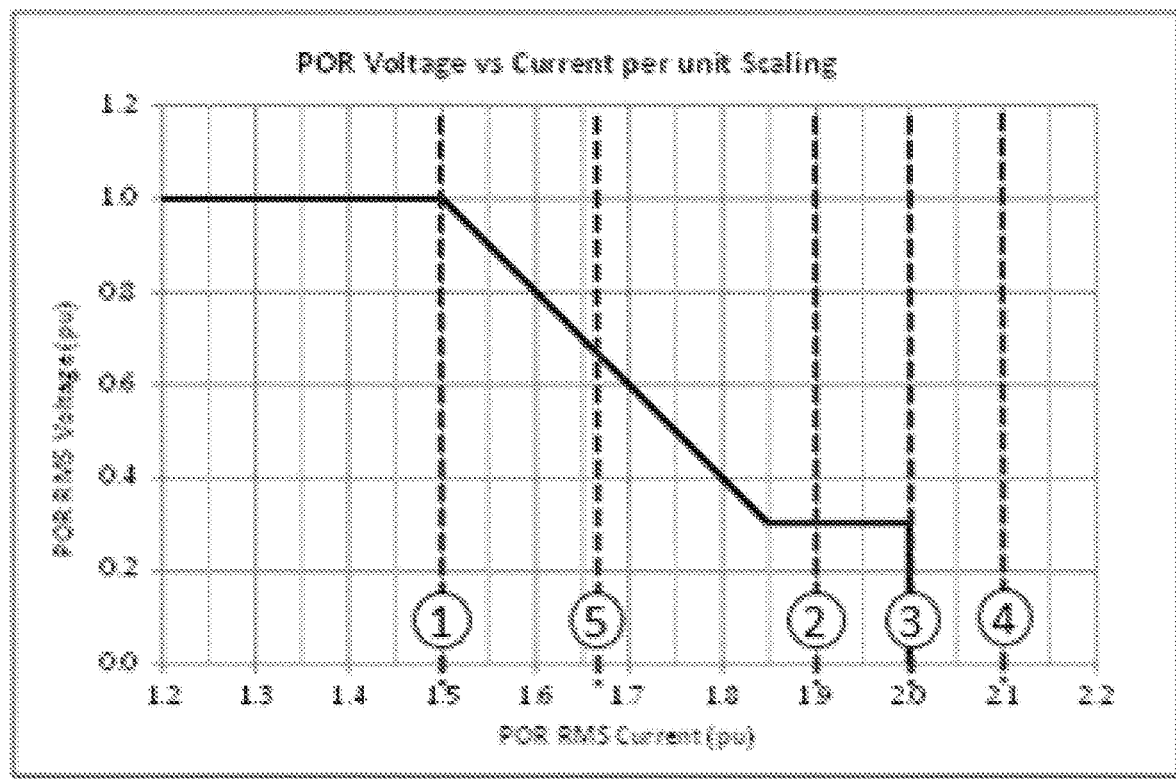
FIG. 2 shows a foldback curve diagram.

If the AC output voltage is overloaded but no short circuit is present, the AC output voltage can be ramped up to a value set by a pre-determined by a fold-back curve, e.g., as shown in FIG. 2. The foldback curve, represents relationship between output voltage and load current produced by the VSCF at the POR. The first key point in the curve is the maximum current at rated voltage, v,i point 1, this is the maximum power that is allowed to be extracted from the variable frequency generator, beyond this point the voltage must be reduced as a function of current to limit the power to the load to a level equal or less than the power extracted at point 1. The second key point in the foldback curve is the maximum output current delivered during short circuits when the output voltage is zero point 3. The controller will adjust the inverter voltage to limit and regulate POR current delivered to the fault per the preset current limit previously mentioned. Prior to ramping up the voltage the reset threshold must be raised to a level that is above the peak short circuit regulating currents point 4. This allows the VSCF to source short circuit current for a continuous steady state period of time to clear circuit breakers in series with the fault and downstream of the POR.

When the power converter has ramped up to the value determined by the pre-determined by a fold-back curve or short-circuit current reference value, a higher reset detection threshold can be set by the controller to be used for any subsequent resets of the output voltage. If the fault is no longer present as the voltage is ramped up, the voltage will return to its normal predetermined level and after a preset amount of time if the current is below line 5 the over current reset threshold will be reset from threshold 2, line 4 to threshold 1, line 2. This last transition will prepare the VSCF for the next potential fault.

The methods and systems of the present disclosure, as described above and shown in the drawings, provide for a method for short-circuit control. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A method of operating a power conversion system comprising the steps of:
    converting variable frequency AC voltage to constant frequency AC voltage by a power converter;
    setting a first peak current reset threshold above operating currents previously observed during steady state short circuit current regulation by a controller of the power converter;
    setting a second peak current reset threshold at a current lower than the previously observed steady state short-circuit regulation point during steady state short circuit current regulation by the controllers of the power converter;
    resetting converter AC output regulating voltage to 0 volts; and
    ramping AC output regulating voltage back up into steady-state operation when the second peak current reset threshold is exceeded;
    wherein if a short circuit is present, the AC output regulating voltage and current output ramp up at a controlled rate; and
    increasing an inverter operating duty cycle up to a value where a controller is limiting and regulating short circuit currents.

2. The method of claim 1, further comprising raising the second peak current reset threshold to the first peak current reset threshold in order to allow for the converter to deliver short circuit currents levels.

3. The method of claim 1, wherein the inverter operating duty cycle is increased to a preset short circuit rms current reference value of 1.5 to 2.5 times rated load current.

4. The method of claim 1, wherein if the AC output voltage is overloaded but no short circuit is present, the AC output voltage ramps up to a value set by a pre-determined fold-back curve.

5. The method of claim 4, wherein the foldback curve, represents a relationship between output voltage and load current produced by a variable speed constant frequency (VSCF).

6. The method of claim 4, wherein when the power converter has ramped up to the value determined by the pre-determined fold-back curve or short-circuit current reference value, a higher reset detection threshold is set by the controller to be used for any subsequent resets of the output voltage.

\* \* \* \* \*